(12) United States Patent
Kodaira et al.

(10) Patent No.: US 12,064,906 B2
(45) Date of Patent: Aug. 20, 2024

(54) MANUFACTURING METHOD AND INJECTION MOLDING SYSTEM

(71) Applicants: Canon Virginia, Inc., Newport News, VA (US); CANON U.S.A., INC., Melville, NY (US)

(72) Inventors: Koki Kodaira, Tokyo (JP); Yuichi Yanahara, Moriyama (JP); Kenta Inaba, Kawasaki (JP)

(73) Assignees: Canon Virginia, Inc., Newport News, VA (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 17/611,515

(22) PCT Filed: May 13, 2020

(86) PCT No.: PCT/US2020/032718
§ 371 (c)(1),
(2) Date: Nov. 15, 2021

(87) PCT Pub. No.: WO2020/236487
PCT Pub. Date: Nov. 26, 2020

(65) Prior Publication Data
US 2022/0242017 A1    Aug. 4, 2022

Related U.S. Application Data

(60) Provisional application No. 62/849,664, filed on May 17, 2019.

(51) Int. Cl.
B29C 45/73    (2006.01)
B29C 45/04    (2006.01)
B29C 45/78    (2006.01)

(52) U.S. Cl.
CPC .......... *B29C 45/0408* (2013.01); *B29C 45/73* (2013.01); *B29C 45/78* (2013.01);
(Continued)

(58) Field of Classification Search
None
See application file for complete search history.

(56) References Cited

U.S. PATENT DOCUMENTS 11,104,050 B2    8/2021   Nakamura
2001/0001688 A1*  5/2001  Yoshizaki ........... B29C 44/0415
                                                       428/318.8
(Continued)

FOREIGN PATENT DOCUMENTS

JP    07-137083 A      5/1995
JP    2007261058 A    10/2007
(Continued)

OTHER PUBLICATIONS

English Translation of JP2016112771 (Year: 2016).*

*Primary Examiner* — Alison L Hindenlang
*Assistant Examiner* — Debjani Roy
(74) *Attorney, Agent, or Firm* — Canon U.S.A., Inc., IP Division

(57) ABSTRACT

A manufacturing system including an injection molding machine and a conveyance apparatus injections a mold and cools the mold at a molding operation position in the injection molding machine, ejections a molded part from the mold at the molding operation position, and conveys the mold to a path of the conveyance apparatus and heats the mold on the path.

5 Claims, 9 Drawing Sheets

(52) U.S. Cl.
CPC ............... *B29C 2945/76531* (2013.01); *B29C 2945/76732* (2013.01)

(56) References Cited

U.S. PATENT DOCUMENTS

| | | | |
|---|---|---|---|
| 2008/0036108 A1* | 2/2008 | Domodossola | B29C 45/73 |
| | | | 264/40.6 |
| 2011/0204547 A1 | 8/2011 | Lofgren | |
| 2014/0319732 A1 | 10/2014 | Olaru | |
| 2015/0048550 A1* | 2/2015 | Kaczmarek | B29C 45/0416 |
| | | | 425/575 |
| 2016/0311146 A1* | 10/2016 | Ichihara | B29C 45/1769 |
| 2018/0009146 A1* | 1/2018 | Nakamura | B29C 45/80 |

FOREIGN PATENT DOCUMENTS

| | | | | |
|---|---|---|---|---|
| JP | 2016112771 | * | 6/2016 | ............. B29C 45/72 |
| JP | 6121601 B1 | | 4/2017 | |
| JP | 2018001738 A | | 1/2018 | |

\* cited by examiner

| | Modeling Material | Molding Target | Heating Medium | Cooling Medium |
|---|---|---|---|---|
| Outside Heating | ABS Resin | TV Frame/ Printer Frame | Oil/High Temperature Water | Cooling Water |
| | Tg:88°C | | Max Temperature: 100°C | Cooling Temperature: 25°C |
| Inside Heating | PC+GF30% | PC Frame | Electromagnetic Induction Device | Cooling Water |
| | Tg:147°C | | Max Temperature: 160°C | Cooling Temperature: 25°C |

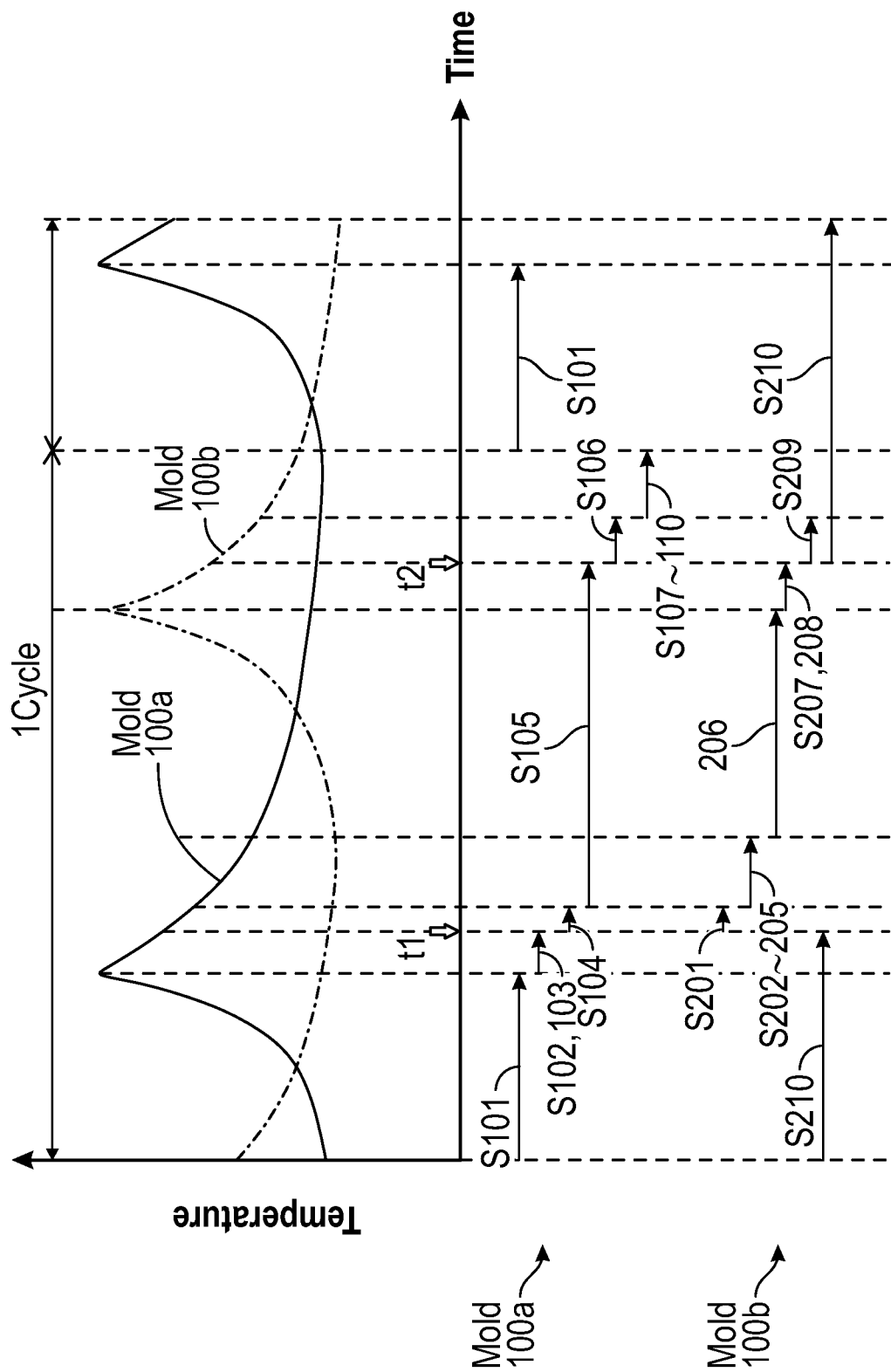

MANUFACTURING METHOD AND INJECTION MOLDING SYSTEM

CROSS-REFERENCE TO RELATED APPLICATION

This application claims the benefit of U.S. Provisional Application 62/849,664, which was filed on May 17, 2019.

FIELD OF THE DISCLOSURE

The present disclosure relates to an injection molding system.

BACKGROUND

Manufacturing of molded parts by an injection molding machine includes injecting a resin into a mold after clamping the mold, pressing the resin into the mold at a high pressure in order to compensate for a volume decrease due to solidification of the resin, keeping the molded part in the mold until the resin solidifies, and ejecting the molded part from the mold.

In the above-described molding approach, a method that uses two molds with one injection molding machine in order to enhance productivity has been proposed. For example, US 2018/0009146/Japanese patent publication No. 2018-001738/VN20160002505 are seen to discuss a system in which conveying devices 3A and 3B are arranged on both sides of an injection molding machine 2. In this system, molded parts are manufactured while alternating a plurality of molds by the conveying devices 3A and 3B for the one injection molding machine 2. FIGS. 1-4 illustrate an injection molding system of US 2018/0009146/Japanese patent publication No. 2018-001738/VN20160002505.

In this system, cooling of the molds 100A or 100B is performed on the conveying machines 3A or 3B outside of the injection molding machine 2. During cooling of one of the molds 100A/100B, each process of molded part ejection→clamping→injection/dwelling is performed by the injection molding machine 2 for the other mold 100A/100B. Since opening and molded part ejection are performed by the injection molding machine 2, the conveying machines 3A and 3B do not need a function for opening and a function for molded part ejection.

This enables manufacture of the molded part P while alternating the plurality of the molds by the one injection molding machine 2. This can reduce the overall cost of the system.

If the time required for all processes from the start of the mold replacement process, to the other mold ejecting process, injection process, and dwelling process, and up until completion of the mold replacement process once again fits into the time required for cooling one of the molds, then productivity compared to normal molding is improved by a maximum of two times. That is, in addition to suppressing cost increases, there is the merit that it is possible to realize high productivity.

A technique for heat and cool molding is known. In this technique, the mold is heated in advance to a temperature higher than the thermal deformation temperature of the resin, and after the resin is injected into the mold, the mold is cooled. While this technique can prevent appearance defects of molded parts, it requires an apparatus for forced heating and cooling. In addition, there is a disadvantage that the molding process is longer than that of a typical molding method.

In the system of Japanese patent publication No. H7-119012, because the molded part is ejected outside the injection molding machine, it is necessary to provide a mold opening/closing mechanism for each ejecting apparatus. It is also necessary to provide a molded part ejecting mechanism for each ejecting apparatus. Accordingly, multiple mold opening/closing mechanisms and molded part ejecting mechanisms become necessary, and the cost of the system as a whole becomes expensive.

While the system of Japanese patent publication No. H7-119012 can enhance productivity compared to normal molding by executing the cooling process both inside and outside the injection molding machine, there is room for further improvement. For example, if the times for processes inside and outside the injection molding machine are respectively assigned to be half that of the overall molding process, productivity will be maximized.

Japanese patent publication No. H10-180797 discloses a technology about insert molding. Injection molding is performed after transferring a part into the mold, and the insert molding technology that performs integral molding of the relevant part and resin is widely known. However many parts to be inserted are prepared beforehand.

What is needed is a technique for heat and cool molding in an injection molding system where multiple molds are alternated.

SUMMARY

According to a least one aspect of the present disclosure, a method of a manufacturing system including an injection molding machine and a conveyance apparatus includes a first step of injecting a mold and cooling the mold at a molding operation position in the injection molding machine, a second step of ejecting a molded part from the mold at the molding operation position, and a third step of conveying the mold to a path of the conveyance apparatus and heating the mold on the path.

This and other embodiments, features, and advantages of the present disclosure will become apparent upon reading the following detailed description of exemplary embodiments of the present disclosure, when taken in conjunction with the appended drawings, and provided claims.

BRIEF DESCRIPTION OF DRAWINGS

FIG. 10 illustrates a graph indicating the transition of the temperatures of both mold 100A and mold 100B.

Figure 1:
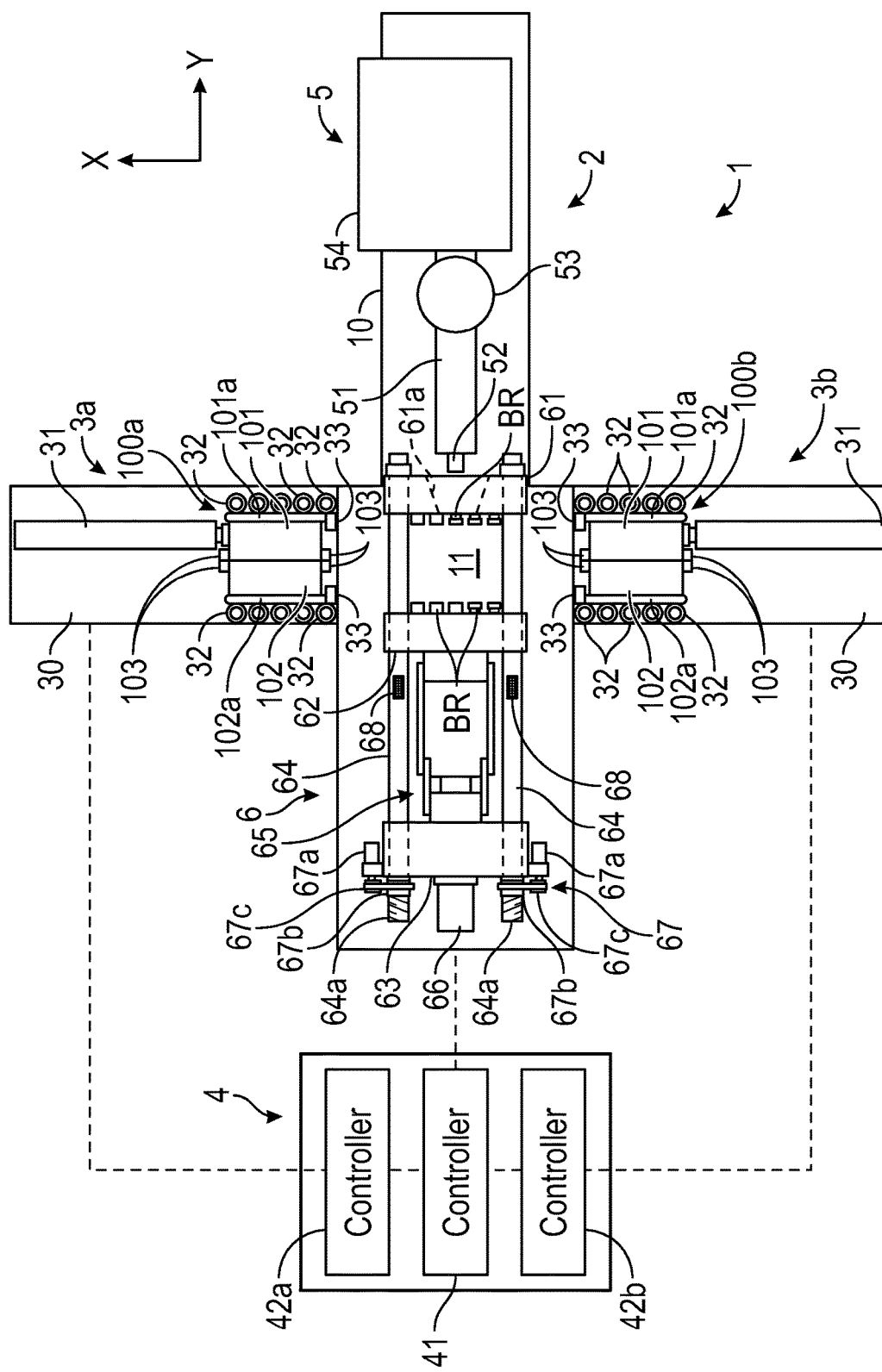
FIG. 1 is illustrates an injection molding system.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION OF EXEMPLARY EMBODIMENTS

The present disclosure has several embodiments and relies on patents, patent applications and other references for details known to those of the art. Therefore, when a patent, patent application, or other reference is cited or repeated herein, it should be understood that it is incorporated by reference in its entirety for all purposes as well as for the proposition that is recited.

With reference to the drawings, the arrow symbols X and Y in each Figure indicate horizontal directions that are orthogonal to each other, and the arrow symbol Z indicates a vertical (upright) direction with respect to the ground.

FIGS. 1-4 illustrate injection molding system 1 of US 2018/0009146/Japanese patent publication No. 2018-001738/VN20160002505 and are being provided herein for information/description purposes only.

The injection molding system 1 includes an injection molding machine 2, conveying machines 3A and 3B, and a control apparatus 4. The injection molding system 1 manufactures a molded part while alternating a plurality of molds using the conveying machines 3A and 3B for the one injection molding machine 2. Two molds, 100A and 100B are used.

The mold 100A/100B is a pair of a fixed mold 101 and a movable mold 102, which is opened/closed in relation to the fixed mold 101. The molded part is molded by injecting a molten resin into a cavity formed between the fixed mold 101 and the movable mold 102. Clamping plates 101a and 102a are respectively fixed to the fixed mold 101 and the movable mold 102. The clamping plates 101a and 102a are used to lock the mold 100A/100B to a molding operation position 11 (mold clamping position) of the injection molding machine.

For the mold 100A/100B, a self-closing unit 103 is provided for maintaining a closed state between the fixed mold 101 and the movable mold 102. The self-closing unit 103 enables preventing the mold 100A/100B from opening after unloading the mold 100A/100B from the injection molding machine 2. The self-closing unit 103 maintains the mold 100A/100B in a closed state using a magnetic force. The self-closing unit 103 located at a plurality of locations along opposing surfaces of the fixed mold 101 and the movable mold 102. The self-closing unit 103 is a combination of an element on the side of the fixed mold 101 and an element on the side of the movable mold 102. For the self-closing unit 103, typically two or more pair are installed for one of the molds 100A and 100B.

A conveying machine 3A loads and unloads the mold 100A onto/from the molding operation position 11 of the injection molding machine 2. A conveying machine 3B loads and unloads the mold 100B onto/from the molding operation position 11. The conveying machine 3A, the injection molding machine 2, and the conveying machine 3B are arranged to be lined up in this order in the X-axis direction. In other words, the conveying machine 3A and the conveying machine 3B are arranged laterally with respect to the injection molding machine 2 to sandwich the injection molding machine 2 in the X-axis direction. The conveying machines 3A and 3B are arranged to face each other, and the conveying machine 3A is arranged on one side laterally of the injection molding machine 2, and the conveying machine 3B is arranged on the other side respectively adjacent. The molding operation position 11 is positioned between the conveying machine 3A and the conveying machine 3B. The conveying machines 3A and 3B respectively include a frame 30, a conveyance unit 31, a plurality of rollers 32, and a plurality of rollers 33.

The frame 30 is a skeleton of the conveying machine 3A and 3B, and supports the conveyance unit 31, and the pluralities of rollers 32 and 33. The conveyance unit 31 is an apparatus that moves the mold 100A/100B back and forth in the X-axis direction, and that removes and inserts the mold 100A/100B in relation to the molding operation position 11.

The conveyance unit 31 is an electrically driven cylinder with a motor as a driving source, and includes a rod that moves forward/backward in relation to the cylinder. The cylinder is fixed to the frame 30, and the fixed mold 101 is fixed to the edge portion of the rod. For the conveyance unit 31 both a fluid actuator and an electric actuator can be used, where the electric actuator can provide better precision of control of the position or the speed when conveying the mold 100A/100B. The fluid actuator can be an oil hydraulic cylinder, or an air cylinder, for example. The electric actuator can, in addition to an electrically driven cylinder, be a rack-and-pinion mechanism with a motor as the driving source, a ball screw mechanism with a motor as the driving source, or the like.

The conveyance unit 31 is arranged independently for each of the conveying machines 3A and 3B. However, a common support member that supports the molds 100A and 100B can be used, and a single common conveyance unit 31 can be arranged for this support member. A case where the conveyance unit 31 is arranged independently for each of the conveying machines 3A and 3B enables handling cases where a movement strokes differ between the mold 100A and the mold 100B when conveying. For example, a case in which molds cannot be conveyed simultaneously since the widths of the molds (the width in the X direction) differ or the thickness of the molds (the width in the Y direction) differ.

The plurality rollers 32 configure a row of rollers arranged in the X-axis direction, where two rows are configured separated in the Y-axis direction. The plurality of rollers 32 rotate around the axis of revolution in the Z-axis direction, and guide movement in the X-axis direction of the mold 100A/100B contacting the side surfaces of the mold 100A/100B (the side surfaces of the clamping plates 101a and 102a) and supporting the mold 100A/100B from the side. The plurality rollers 33 configure a row of rollers arranged in the X-axis direction, where two rows are configured separated in the Y-axis direction. The plurality of rollers 33 rotate around the axis of revolution in the Y direction, and cause movement in the X direction of the mold 100A/100B to be smooth, supporting the bottom surfaces of the mold 100A/100B (the bottom surfaces of the clamping plates 101a and 102a) and supporting the mold 100A/100B from below.

The control apparatus 4 includes a controller 41 for controlling the injection molding machine 2, a controller 42A for controlling the conveying machine 3A, and a controller 42B for controlling the conveying machine 3B.

Each of the controllers 41, 42A and 42B includes, for example, a processor such as a CPU, a RAM, a ROM, a storage device such as a hard disk, and interfaces connected to sensors or actuators (not illustrated). The processor executes programs stored in the storage device. An example of a program (control) that the controller 41 executes is described below. The controller 41 is communicably connected with the controllers 42A and 42B, and provides instructions related to the conveyance of the mold 100A/100B to the controllers 42A and 42B. The controllers 42A and 42B, if loading and unloading of the mold 100A/100B terminates, transmit a signal for operation completion to the controller 41. In addition, the controllers 42A and 42B transmit an emergency stop signal at a time of an abnormal occurrence to the controller 41.

A controller is arranged for each of the injection molding machine 2, the conveying machine 3A, and the conveying machine 3B, but one controller can control all three machines. The conveying machine 3A and the conveying machine 3B can be controlled by a single controller for more reliable and collaborative operation.

Figure 2:
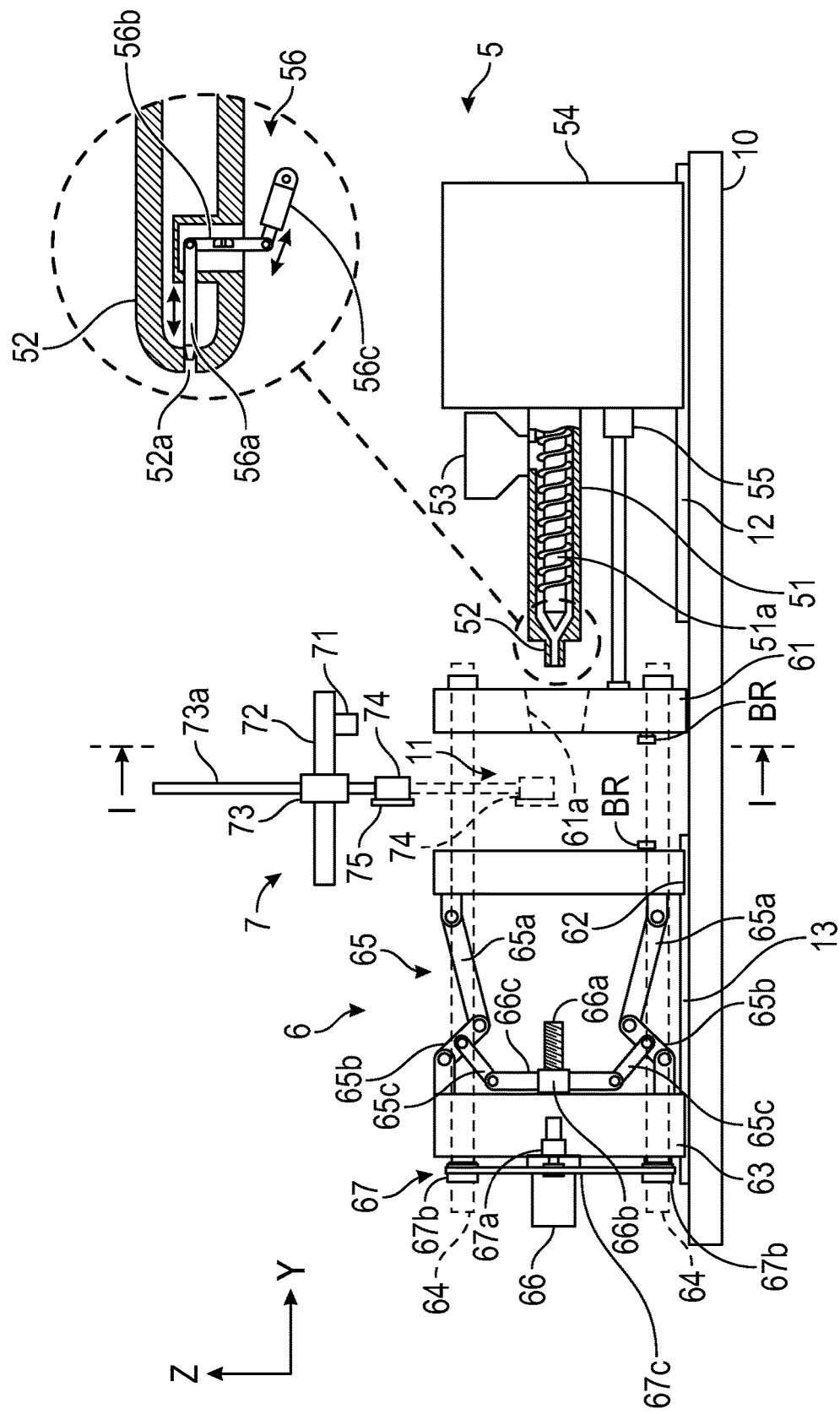
FIG. 2 is a side view of an injection molding machine.
Figure 3:
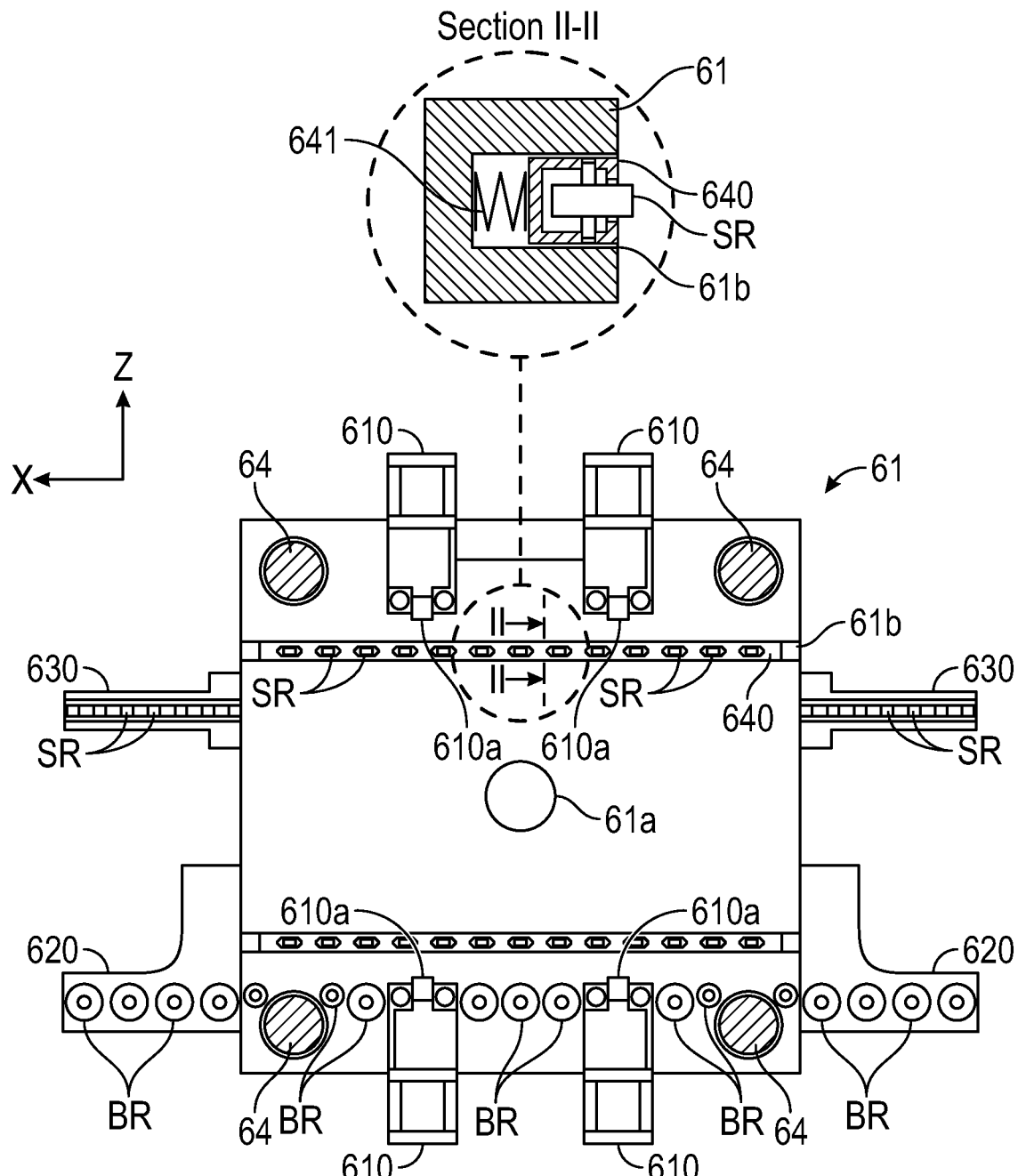
FIG. 3 is an end view of a fixed platen and a figure viewing from the arrow direction of the I-I line in FIG. 2.
Figure 4:
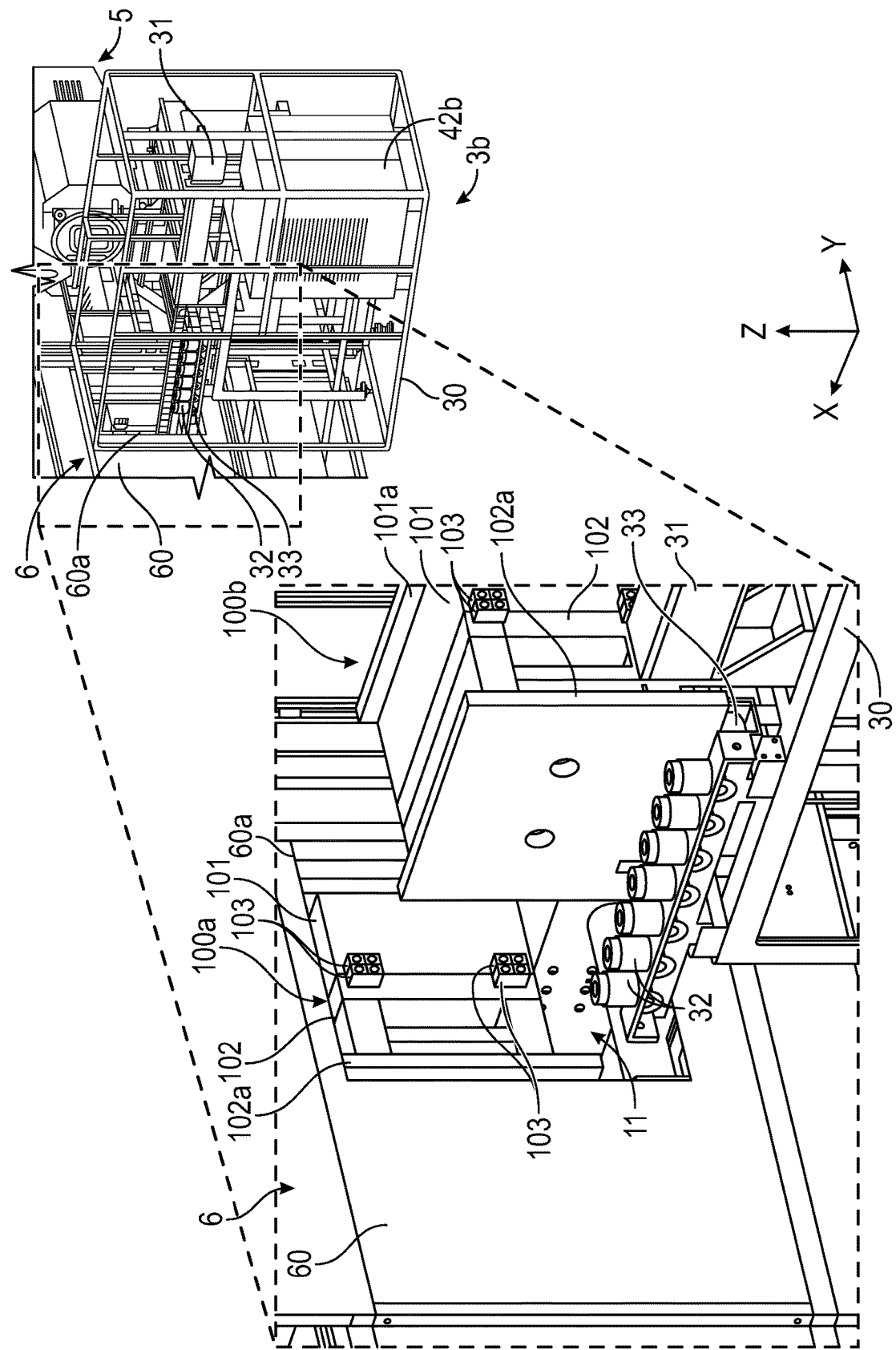
FIG. 4 is a partial perspective view for describing the configuration of a periphery of the molding operation position.

FIG. 2 illustrates a side view of the injection molding machine 2. FIG. 3 illustrates an end view of a fixed platen 61, and a figure viewing from the arrow direction of the I-I line in FIG. 2. FIG. 4 illustrates a partial perspective view for describing the configuration of a periphery of the molding operation position 11.

With reference to FIG. 1 and FIG. 2, the injection molding machine 2 includes an injecting apparatus 5, a clamping apparatus 6, and a take-out robot 7 for ejecting a molded part. The injecting apparatus 5 and the clamping apparatus 6 are arranged on a frame 10 in the Y-axis direction.

The injecting apparatus 5 includes an injection cylinder 51 that is arranged to extend in the Y-axis direction. The injection cylinder 51 includes a heating device (not illustrated) such as a band heater, and melts a resin introduced from a hopper 53. A screw 51a is integrated into the injection cylinder 51, and by rotation of the screw 51a, plasticizing and measuring the resin introduced into the injection cylinder 51 are performed, and by movement in the axial direction (Y-axis direction) of the screw 51a, it is possible to inject a molten resin from an injection nozzle 52.

In FIG. 2, an example of a shut-off nozzle as the nozzle 52 is illustrated. For an opening/closing mechanism 56 of FIG. 2, a pin 56a for opening/closing the discharge port 52a is arranged. The pin 56a is connected with an actuator (a cylinder) 56c via a link 56b, and by the operation of the actuator 56c the discharge port 52a is opened and closed.

The injection cylinder 51 is supported by a driving unit 54. In the driving unit 54, a motor for plasticizing and measuring the resin by rotationally drive the screw 51a, and a motor for driving the screw 51a to move forward/backward in the axial direction are arranged. The driving unit 54 can move forward/backward in the Y-axis direction along a rail 12 on the frame 10, and in the driving unit 54, an actuator (for example, an electrically driven cylinder) 55 for causing the injecting apparatus 5 to move forward/backward in the Y-axis direction is arranged.

The clamping apparatus 6 performs a clamping and opening and closing of the molds 100A/100B. In the clamping apparatus 6, the following are arranged in order in the Y-axis direction: the fixed platen 61, a movable platen 62, and a movable platen 63. Through platens 61 to 63, a plurality of tie-bars 64 pass. Each of the tie-bars 64 is an axis that extends in the Y-axis direction, one end of which is fixed to the fixed platen 61. Each of the tie-bars 64 is inserted into a respective through hole formed in the movable platen 62.

The other end of each of the tie-bars 64 is fixed to the movable platen 63 through an adjusting mechanism 67. The movable platens 62 and 63 can move in the Y-axis direction along a rail 13 on the frame 10, and the fixed platen 61 is fixed to the frame 10.

A toggle mechanism 65 is arranged between the movable platen 62 and the movable platen 63. The toggle mechanism 65 causes the movable platen 62 to move forward/backward in the Y-axis direction in relation to the movable platen 63 (in other words, in relation to the fixed platen 61). The toggle mechanism 65 includes links 65a to 65c. The link 65a is connected rotatably to the movable platen 62. The link 65b is pivotably connected to the movable platen 63. The link 65a and the link 65b are pivotably connected to each other. The link 65c and the link 65b are pivotably connected to each other. The link 65c is pivotably connected to an arm 66c.

The arm 66c is fixed on a ball nut 66b. The ball nut 66b engages a ball screw shaft 66a that extends in the Y-axis direction, and moves forward/backward in the Y-axis direction by rotation of the ball screw shaft 66a. The ball screw shaft 66a is supported such that it is free to rotate by the movable platen 63, and a motor 66 is supported by the movable platen 63. The motor 66 rotationally drives the ball screw shaft 66a while the rotation amount of the motor 66 is detected. Driving the motor 66 while detecting the rotation amount of the motor 66 enables clamping, opening, and closing of the mold 100A/100B.

The injection molding machine 2 includes sensors 68 for measuring a clamping force, where each sensor 68 is, for example, a strain gauge provided on the tie-bar 64, and calculates a clamping force by detecting a distortion of the tie-bar 64.

The adjusting mechanism 67 includes nuts 67b supported to freely rotate on the movable platen 63, motors 67a as driving sources, and transfer mechanisms for transferring the driving force of the motors 67a to the nuts 67b. Each of the tie-bars 64 passes through a hole formed in the movable platen 63, and engages with the nut 67b. By causing the nuts 67b to rotate, the engagement positions in the Y-axis direction between the nuts 67b and the tie-bars 64 change. That is, the position at which the movable platen 63 is fixed in relation to the tie-bar 64 changes. With this, it is possible to cause a space between the movable platen 63 and the fixed platen 61 to change, and thereby it is possible to adjust a clamping force or the like.

The molding operation position 11 is a region between the fixed platen 61 and the movable platen 62.

The mold 100A/100B introduced into the molding operation position 11 are sandwiched between the fixed platen 61 and the movable platen 62 and thereby clamped. Opening and closing in based on movement of the movable mold 102 by movement of the movable platen 62 is performed.

FIG. 3 illustrates an opening portion 61a in a central portion of the fixed platen 61 through which the nozzle 52 moves forward/backward. To the surface on the side of the movable platen 62 (called an inner surface) of the fixed platen 61 a plurality of rollers BR are supported such that they are free to rotate. The plurality of rollers BR rotate around the axis of revolution in the Y-axis direction, and cause movement in the X-axis direction of the mold 100A/100B to be smooth, supporting the bottom surfaces (the bottom surface of the clamping plate 101a) of the mold 100A/100B and supporting the mold 100A/100B from below. On both sides in the X-axis direction of the fixed platen 61, a roller supporting body 620 is fixed, and the plurality of rollers BR are supported by the roller supporting body 620.

On the inner surface of the fixed platen 61, grooves 61*b* that extend in the X-axis direction are formed.

The grooves 61*b* are formed in two rows separated vertically. On each of the grooves 61*b* a roller unit 640 is arranged. For the roller unit 640, a plurality of rollers SR are supported such that they are free to rotate. The plurality of rollers SR rotate around the axis of revolution in the Z-axis direction, and guide movement in the X-axis direction of the mold 100A/100B contacting the outer surfaces of the mold 100A/100B (the outer surface of the clamping plate 101*a*) and supporting the mold 100A/100B from the side. As illustrated in the cross sectional view of the line II-II, while the roller unit 640, by a bias of a spring 641, is positioned at a position at which the roller SR protrudes from the groove 61*b*, at a time of clamping it is retracted in the groove 61*b*, and positioned at a position at which the roller SR does not protrude from the groove 61*b*. The roller unit 640 can prevent the inner surfaces of the mold 100A/100B and the fixed platen 61 from contacting and damaging the inner surfaces at a time of alternating the mold 100A/100B, and the roller unit 640 does not impede the inner surface of the fixed platen 61 and the mold 100A/100B being closed at a time of clamping.

On both sides in the X-axis direction of the fixed platen 61, a roller supporting body 630 is fixed, and a plurality of rollers SR are supported by the roller supporting body 630.

On the fixed platen 61, a plurality of fixing mechanisms (clamps) 610 are arranged for fixing the fixed mold 101 to the fixed platen 61. Each fixing mechanism 610 includes an engaging portion 610*a* that engages with the clamping plate 101*a*, and a built-in actuator (not illustrated) that moves the engaging portion 610*a* between an engagement position and an engagement release position.

Note that for the movable platen 62, similarly to the fixed platen 61, a plurality of rollers BR, the roller supporting bodies 620 and 630, the roller unit 640, and the fixing mechanism 610 for fixing the movable mold 102 are arranged.

As illustrated in FIG. 4, the periphery of the clamping apparatus 6 is surrounded by a cover (exterior covering plate) 60 for safety, but openings 60*a* through which the mold 100A/100B pass are formed on the sides of the molding operation position 11 for alternating the mold 100A/100B. Each opening 60*a* is typically continuously open, enabling free removal and insertion of the mold 100A/100B from and to the molding operation position 11.

Returning to FIG. 2, the take-out robot 7 will now be described. The take-out robot 7 includes a rail 71 that extends in the X-axis direction, and a movable rail 72 that can move in the X-axis direction on the rail 71. The movable rail 72 is arranged to extend in the Y-axis direction, and a slider 73 is arranged on the movable rail 72. The slider 73 moves in the Y-axis direction guided by the movable rail 72, and moves up and down an elevating shaft 73*a* in the Z-axis direction. On a lower end of the elevating shaft 73*a*, a vacuum head 74 is arranged, and on the vacuum head 74, a chuck plate 75 specialized to a molded part is mounted.

The take-out robot 7, after opening, moves the vacuum head 74 between the fixed mold 101 and the movable mold 102 as illustrated by broken lines in FIG. 2 by the rail 71, the movable rail 7, and the slider 73, sticks to the molded part, and conveys it outside the mold 100A/100B.

Figures 5, 6:
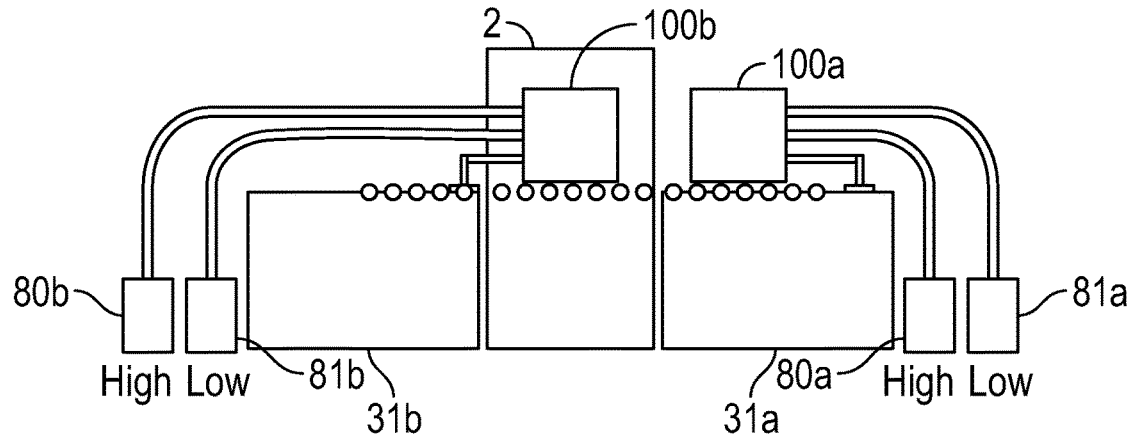
FIG. 5 illustrates the configuration for controlling a temperature of the mold.
FIG. 6 is a list illustrating the conditions for heat and cool molding.

The configuration for controlling a temperature of the mold 100 is described with respect to FIG. 5. In the exemplary embodiment, high temperature controllers 80A and 80B and low temperature controllers 81A and 18B are provided for the heat and cool molding. A high temperature controller 80A and a low temperature controller 81A are connected with the mold 100A, and a high temperature controller 80B and a low temperature controller 81B are connected with the mold 100B. In another exemplary embodiment, a single high temperature controller can raise. The temperatures of both the mold 100A and the mold 100B, and single low temperature controller can lower the temperatures of both the mold 100A and the mold 100B.

In another exemplary embodiment where a hot runner is used, a hot runner controller for adjusting the temperature of the hot runner is included. The hot runner maintains the temperature of the molding material injected into the mold at an arbitrary temperature. This can prevent unnecessary disposal of the molding material. Hot runner controllers can be provided with the mold 100A and the mold 100B respectively. A single hot runner controller can adjust the temperatures of both the mold 100A and the mold 100B. In still yet another exemplary embodiment where a cold runner is used, the temperature of the cold runner is approximately the same as the temperature of the mold. In this exemplary embodiment, it is unnecessary to add further temperature controllers to the injection molding system.

In the present exemplary embodiment, whether the heating process is performed in a state where the mold is outside of the injection molding machine 2 or the heating process is performed in a state where the mold is inside the injection molding machine 2 depends on the lengths of a heating time and a cooling time. In a case where the heating time is longer than the cooling time, the heating process is performed outside the injection molding machine 2. In a case where the heating time is shorter than the cooling time, the heating is performed in the injection molding machine 2. The longer of the heating time or the cooling time is included in a waiting time in which the mold waits outside the injection molding machine 2. Therefore, the productivity of the injection molding system 1 improves. The injection molding system 1 can choose which of the two sequences to perform. The control apparatus 4 can choose either sequence automatically based on the lengths of the heating time and the cooling time. A user can choose either sequence from an operation panel (not illustrated).

FIG. 6 illustrates an exemplary list of conditions for heat and cool molding. The listed conditions are merely examples, and any item can be replaced by an item that would enable practice of the present embodiment, or additional items can be added to the exemplary list.

In the example where the heating process is performed outside the injection molding machine 2, oil or high-temperature water is used as the heating medium, and cooling water is used as the cooling medium. ABS resin is the exemplary molding material, while a TV frame and printer frame the exemplary molding targets. In the example where the heating process is performed in the injection molding machine 2, an electromagnetic induction device is used as the heating medium, and cooling water is used as the cooling medium. PC (Polycarbonate) added with GF (Glass Fiber) is the exemplary molding material, and a PC frame is the exemplary molding target.

In comparing the two examples, the heating time when using the oil or high-temperature water is longer than the heating time when using the electromagnetic induction device. As a result, the heating time when using the oil or high-temperature water becomes longer than the cooling time, so it is better to perform the heating process outside the injection molding machine 2. The equipment cost for using the oil or high-temperature water is typically cheaper than the equipment cost for using the electromagnetic induction device.

The maximum temperature of the mold 100A/100B is typically approximately 100 degrees C. when using the oil or high-temperature water. The maximum temperature of the mold 100A/100B is typically approximately 160 degrees C. when using the electromagnetic induction device. Based on this difference, there is a constraint for the molding material that the injection molding machine 2 can perform the injection molding. ABS resin melts at 88 degrees C., while PC+GF melts at 147 degrees C. If the injection molding system 1 cannot raise the temperature of the mold higher than the temperature at which the molding material melts, it is difficult to perform the heat and cool molding. Therefore, when PC+GF is used as the molding material, the electromagnetic induction device should be installed. When ABS resin is used as the molding material, oil or high-temperature water or the electromagnetic induction device can be used as the heating medium.

Figure 7:
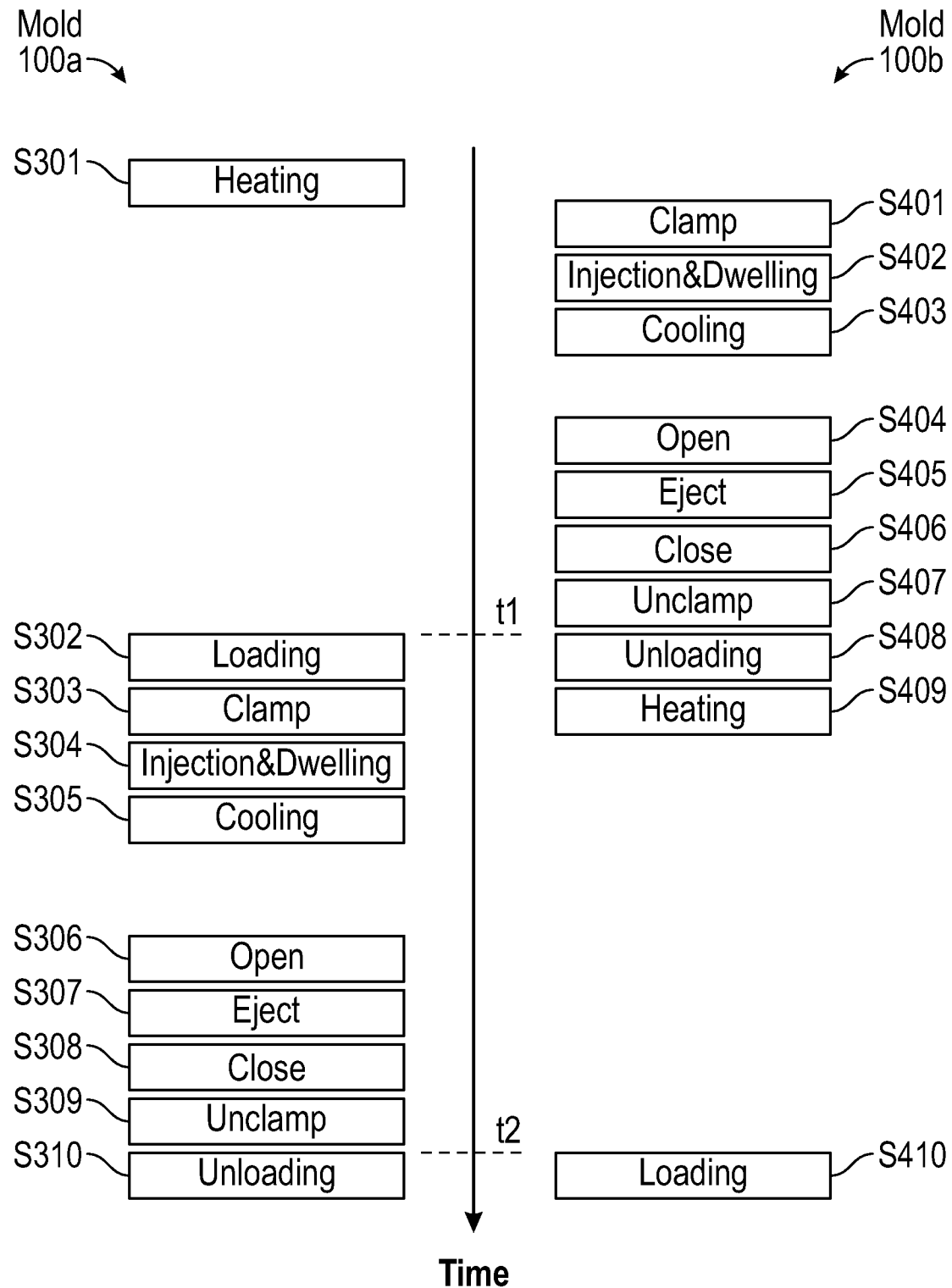
FIG. 7 illustrates a flowchart illustrating injection molding processes in which the heating process is external to the injection molding machine.
Figure 8:
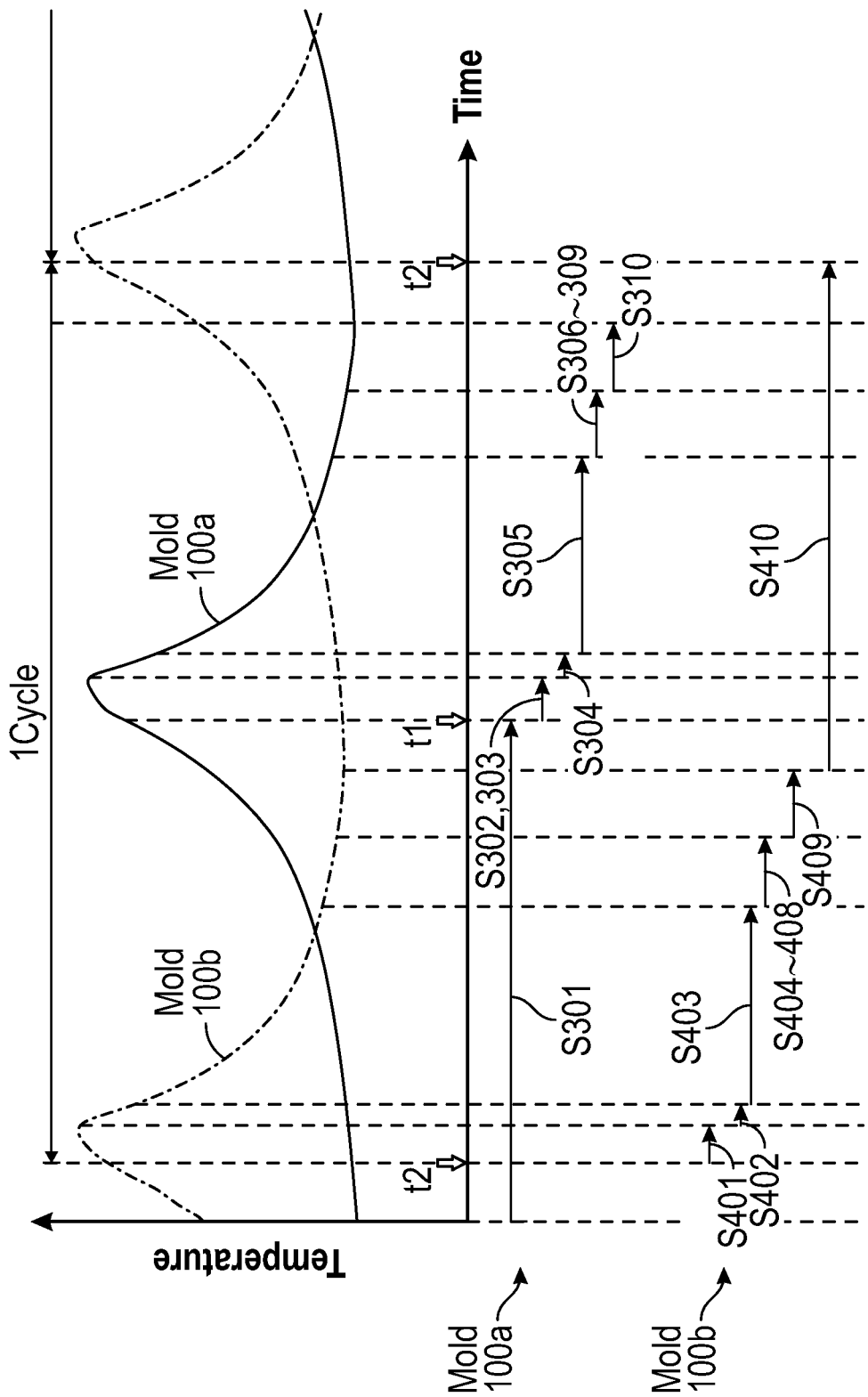
FIG. 8 illustrates a graph indicating the transition of the temperatures of both mold 100A and mold 100B.

FIG. 7 illustrates a flowchart illustrating injection molding processes in which the heating process is external to the injection molding machine 2. Control based on the flowchart in FIG. 7 is executed by the CPU included in the control apparatus 4 based on a program stored in the ROM. FIG. 8 illustrates a graph indicating the transition of the temperatures of both the mold 100A and the mold 100B. Step numbers in FIG. 7 correspond to step numbers in FIG. 8. As illustrated in FIG. 8, some steps in the heating process for the mold 100B completes at a timing associated with the beginning of the flowchart in FIG. 7. At the beginning of the flowchart in FIG. 7, the mold 100A is located outside the injection molding machine 2 and the mold 100B is located inside of the injection molding machine 2 (molding operation position 11).

First, the control apparatus 4 controls the high temperature controller 80A to raise the temperature of the mold 100A located outside the injection molding machine 2 (S301). While the heating process for the mold 100A is performed, the control apparatus 4 performs the process for the mold 100B located inside the injection molding machine 2.

Clamping of the mold 100B by the fixed platen 61 and the movable platen 62 is performed by driving the motor 66 to drive the toggle mechanism 65 (S401). The actuator 55 is driven to move the injecting apparatus 5, causing the nozzle 52 to contact the mold 100B. The injection and dwelling of molten resin into the mold 100B is performed (S402). More specifically, the injecting apparatus 5 is driven to fill molten resin into a cavity in the mold 100B from the nozzle 52, and to press the resin in the cylinder 51 into the mold 100B at a high pressure in order to compensate for a volume decrease due to resin solidifying.

The mold 100B is cooled in the injection molding machine 2. After cooling the mold 100B, the movable platen 62 is separated from the fixed platen 61 by driving the motor 66. The fixed mold 101 is fixed to the fixed platen 61 by the fixing mechanisms 610, and the movable mold 102 is fixed to the movable platen 62 by the fixing mechanisms 610, and therefore the movable mold 102 separates from the fixed mold 101 and the mold 100B is opened.

The molded part remaining on the side of the movable mold 102 of the mold 100B is removed by driving the take-out robot 7 and conveyed outside the mold 100B (S405).

The mold 100B is then closed (S406). The mold 100B is unlocked by releasing the fixing mechanism 610 (S407). After a predetermined time delay from step S402, the motor 66 is driven to drive the toggle mechanism 65. This results in removal of the clamping force, the movable platen 62 slightly separates in relation to the fixed platen 61, and a space by which it is possible to alternate the molds is formed.

Alternation of the mold 100A/100B is then performed (S302, S408). The mold 100B is unloaded from the molding operation position 11 to the conveying machine 3B, and the mold 100A is loaded from the conveying machine 3A to the molding operation position 11. The controller 41 transmits an instruction to unload the mold 100B to the controller 42B, and the controller 42B drives the conveyance unit 31 to unload the mold 100B from the molding operation position 11. When unloading completes, a signal indicating unload completion is transmitted from the controller 42B to the controller 41.

The control apparatus 4 then controls the high temperature controller 80B to raise the temperature of the mold 100B located outside the injection molding machine 2 (S409).

While the heating process for the mold 100B is performed, the control apparatus 4 performs the process for the mold 100A located inside the injection molding machine 2. Clamping of the mold 100A by the fixed platen 61 and the movable platen 62 is performed by driving the motor 66 to drive the toggle mechanism 65 (S303). The actuator 55 is driven to move the injecting apparatus 5, causing the nozzle 52 to contact the mold 100A.

The injection and dwelling of molten resin into the mold 100A is then performed (S304). More specifically, the injecting apparatus 5 is driven to fill molten resin into a cavity in the mold 100A from the nozzle 52, and to press the resin in the cylinder 51 into the mold 100A at a high pressure in order to compensate for a volume decrease due to resin solidifying. The mold 100A is cooled in the injection molding machine 2.

After cooling the mold 100A, the movable platen 62 is separated from the fixed platen 61 by driving the motor 66. The fixed mold 101 is fixed to the fixed platen 61 by the fixing mechanisms 610, and the movable mold 102 is fixed to the movable platen 62 by the fixing mechanisms 610, and therefore the movable mold 102 separates from the fixed mold 101 and the mold 100A is opened.

The molded part remaining on the side of the movable mold 102 of the mold 100A is removed by driving the take-out robot 7, and conveyed outside the mold 100A (S307).

The mold 100A is then closed (S308). The mold 100A is unlocked by releasing the fixing mechanism 610 (S309). After a predetermined time delay from step S304, the motor 66 is driven to drive the toggle mechanism 65. This results in removal of the clamping force, the movable platen 62 slightly separates in relation to the fixed platen 61, and a space by which it is possible to alternate the molds is formed.

Alternation of the mold 100A/100B is performed again (S310, S410). The mold 100A is unloaded from the molding operation position 11 to the conveying machine 3A, and the mold 100B is loaded from the conveying machine 3B to the molding operation position 11.

The controller 41 transmits an instruction to unload the mold 100A to the controller 42A, and the controller 42A drives the conveyance unit 31 to unload the mold 100A from the molding operation position 11. When unloading completes, a signal indicating unload completion is transmitted from the controller 42A to the controller 41. By repeating the above-described process, the heat and cool molding for the mold 100A and the mold 100B is efficiently performed.

Figure 9:
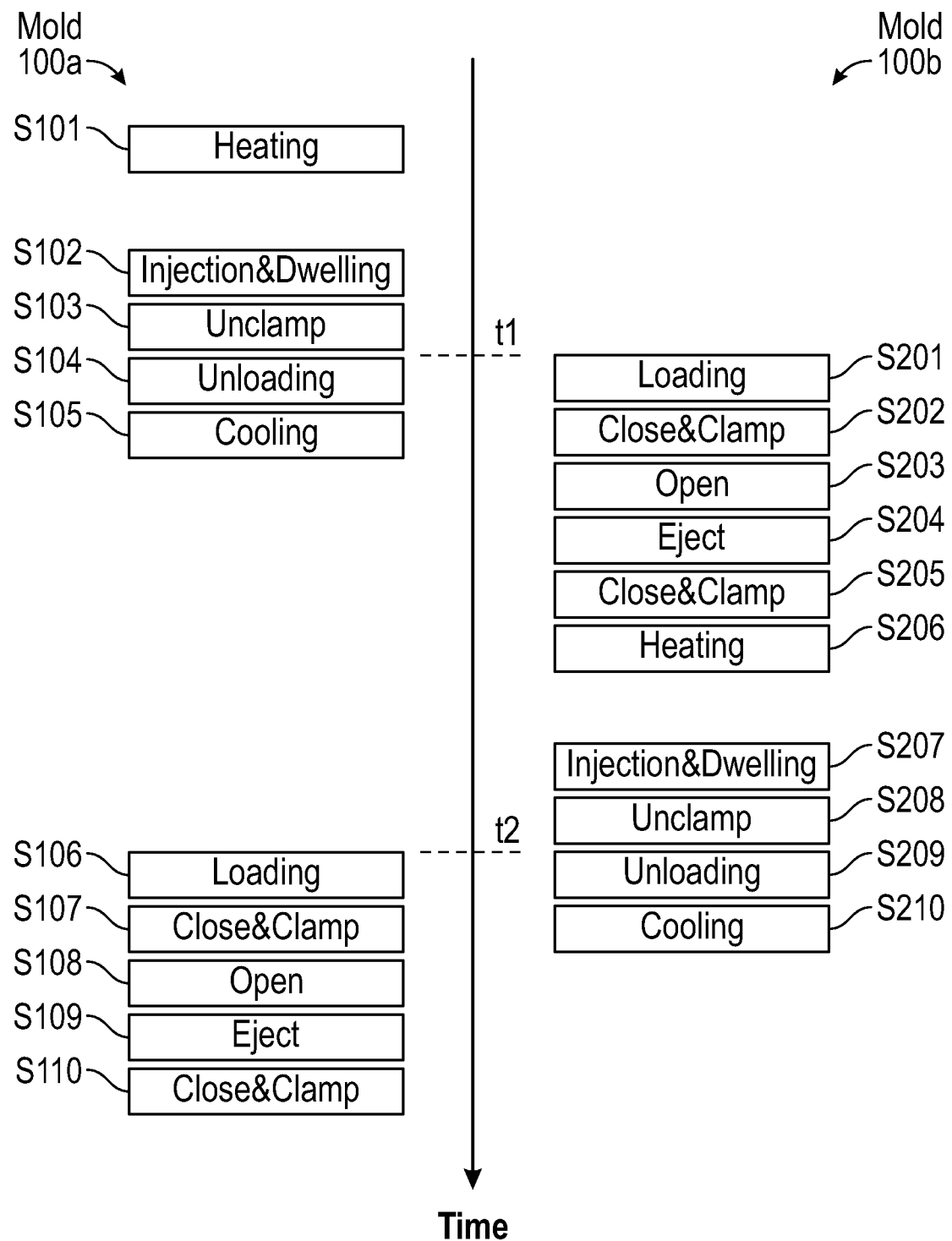
FIG. 9 illustrates a flowchart for injection molding processes in which the heating process is internal to the injection molding machine.

FIG. 9 illustrates a flowchart for injection molding processes in which the heating process is internal to the injection molding machine 2. Control based on the flowchart in FIG. 9 is executed by the CPU included in the control apparatus 4 based on a program stored in the ROM. FIG. 10 illustrates a graph indicating the transition of the temperatures of both the mold 100A and the mold 100B. Step numbers in FIG. 9 correspond to step numbers in FIG. 10. At the beginning of the flowchart in FIG. 9, the mold 100A is located inside the injection molding machine 2 (molding operation position 11) and the mold 100B is located outside the injection molding machine 2.

First, the control apparatus 4 controls the high temperature controller 80A to raise the temperature of the mold 100A (S101). The actuator 55 is driven to move the injecting apparatus 5, causing the nozzle 52 to contact the mold 100A. The injection and dwelling of molten resin into the mold 100A is then performed (S102). More specifically, the injecting apparatus 5 is driven to fill molten resin into a cavity in the mold 100A from the nozzle 52, and to press the resin in the cylinder 51 into the mold 100A at a high pressure in order to compensate for a volume decrease due to resin solidifying.

Next, the mold 100A is unlocked by releasing the fixing mechanism 610 (S103).

After a predetermined time delay from step S102, the motor 66 is driven to drive the toggle mechanism 65. This results in the removal of the clamping force, and the movable platen 62 slightly separates in relation to the fixed platen 61, and a space by which it is possible to alternate the molds is formed.

Alternation of the molds 100 is then performed (S104, S201). The mold 100A is unloaded from the molding operation position 11 to the conveying machine 3A, and the mold 100B is loaded from the conveying machine 3B to the molding operation position 11. The controller 41 transmits an instruction to unload the mold 100A to the controller 42A, and the controller 42A drives the conveyance unit 31 to unload the mold 100A from the molding operation position 11. When unloading completes, a signal indicating unload completion is transmitted from the controller 42A to the controller 41.

The mold 100A is cooled on the conveying machine 3A (S105). While the cooling process for the mold 100A is performed, the control apparatus 4 performs the process for the mold 100B. Clamping of the mold 100B by the fixed platen 61 and the movable platen 62 is performed by driving the motor 66 to drive the toggle mechanism 65 (S202). The movable platen 62 is separated from the fixed platen 61 by driving the motor 66. The fixed mold 101 is fixed to the fixed platen 61 by the fixing mechanisms 610, and the movable mold 102 is fixed to the movable platen 62 by the fixing mechanisms 610, and therefore the movable mold 102 separates from the fixed mold 101 and the mold 100B is opened (S203). The molded part remaining on the side of the movable mold 102 of the mold 100B is removed by driving the take-out robot 7 and conveyed outside the mold 100B (S204). The mold 100B is then closed and clamped (S205).

Next, the control apparatus 4 controls the high temperature controller 80B to raise the temperature of the mold 100B (S206). The actuator 55 is driven to move the injecting apparatus 5, causing the nozzle 52 to contact the mold 100B. The injection and dwelling of molten resin into the mold 100B is then performed (S207). More specifically, the injecting apparatus 5 is driven to fill molten resin into a cavity in the mold 100A from the nozzle 52, and to press the resin in the cylinder 51 into the mold 100A at a high pressure in order to compensate for a volume decrease due to resin solidifying.

The mold 100B is then unlocked by releasing the fixing mechanism 610 (S208). After a predetermined time delay from step S207, the motor 66 is driven to drive the toggle mechanism 65. This results in removal of the clamping force, the movable platen 62 slightly separates in relation to the fixed platen 61, and a space by which it is possible to alternate the molds is formed.

Alternation of the molds 100 is then performed (S106, S209). The mold 100B is unloaded from the molding operation position 11 to the conveying machine 3B, and the mold 100A is loaded from the conveying machine 3A to the molding operation position 11. The controller 41 transmits an instruction to unload the mold 100B to the controller 42B, and the controller 42B drives the conveyance unit 31 to unload the mold 100B from the molding operation position 11. When unloading completes, a signal indicating unload completion is transmitted from the controller 42B to the controller 41.

The mold 100A is cooled on the conveying machine 3B (S105). While the cooling process for the mold 100B is performed, the control apparatus 4 performs the process for the mold 100A. Clamping of the mold 100A by the fixed platen 61 and the movable platen 62 is performed by driving the motor 66 to drive the toggle mechanism 65 (S107). The movable platen 62 is separated from the fixed platen 61 by driving the motor 66. The fixed mold 101 is fixed to the fixed platen 61 by the fixing mechanisms 610, and the movable mold 102 is fixed to the movable platen 62 by the fixing mechanisms 610, and therefore the movable mold 102 separates from the fixed mold 101 and the mold 100A is opened (S108). The molded part remaining on the side of the movable mold 102 of the mold 100A is removed by driving the take-out robot 7, and conveyed outside the mold 100A (S109). The mold 100A is then closed and clamped (S110). By repeating the above-described process, the heat and cool molding for the mold 100A and the mold 100B is efficiently performed.

In the above-described embodiments, either the heating process or the cooling process is performed in the state where the mold 100A/100B is outside the injection molding machine 2. In another exemplary embodiment, both the heating process and the cooling process can be performed in the state where the mold 100A/100B is outside the injection molding machine 2.

For example, one injection molding operation is divided into four processes: heating process, injection/dwelling process, cooling process, and ejection process. While the heating process for the mold 100A is performed, the ejection process for the mold 100B is performed. Next, alternation of the mold 100A/100B is performed. While the injection/dwelling process for the mold 100A is performed, the heating process for the mold 100B is performed. Next, alternation of the mold 100A/100B is performed. While the cooling process for the mold 100A is performed, the injection/dwelling process for the mold 100B is performed. Next, alternation of the mold 100A/100B is performed. While the ejection process for the mold 100A is performed, the cooling process for the mold 100B is performed.

Definitions

In referring to the description, specific details are set forth in order to provide a thorough understanding of the examples disclosed. In other instances, well-known methods, procedures, components and circuits have not been described in detail as not to unnecessarily lengthen the present disclosure.

It should be understood that if an element or part is referred herein as being "on", "against", "connected to", or "coupled to" another element or part, then it can be directly on, against, connected or coupled to the other element or part, or intervening elements or parts may be present. In contrast, if an element is referred to as being "directly on", "directly connected to", or "directly coupled to" another element or part, then there are no intervening elements or parts present. When used, term "and/or", includes any and all combinations of one or more of the associated listed items, if so provided.

Spatially relative terms, such as "under" "beneath", "below", "lower", "above", "upper", "proximal", "distal", and the like, may be used herein for ease of description to describe one element or feature's relationship to another element(s) or feature(s) as illustrated in the various figures. It should be understood, however, that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, a relative spatial term such as "below" can encompass both an orientation of above and below. The device may be otherwise oriented (rotated 90 degrees or at other orientations) and the spatially relative descriptors used herein are to be interpreted accordingly. Similarly, the relative spatial terms "proximal" and "distal" may also be interchangeable, where applicable.

The term "about," as used herein means, for example, within 10%, within 5%, or less. In some embodiments, the term "about" may mean within measurement error.

The terms first, second, third, etc. may be used herein to describe various elements, components, regions, parts and/or sections. It should be understood that these elements, components, regions, parts and/or sections should not be limited by these terms. These terms have been used only to distinguish one element, component, region, part, or section from another region, part, or section. Thus, a first element, component, region, part, or section discussed below could be termed a second element, component, region, part, or section without departing from the teachings herein.

The terminology used herein is for the purpose of describing particular embodiments only and is not intended to be limiting. The use of the terms "a" and "an" and "the" and similar referents in the context of describing the disclosure (especially in the context of the following claims) are to be construed to cover both the singular and the plural, unless otherwise indicated herein or clearly contradicted by context. The terms "comprising," "having," "includes", "including," and "containing" are to be construed as open-ended terms (i.e., meaning "including, but not limited to,") unless otherwise noted. Specifically, these terms, when used in the present specification, specify the presence of stated features, integers, steps, operations, elements, and/or components, but do not preclude the presence or addition of one or more other features, integers, steps, operations, elements, components, and/or groups thereof not explicitly stated. Recitation of ranges of values herein are merely intended to serve as a shorthand method of referring individually to each separate value falling within the range, unless otherwise indicated herein, and each separate value is incorporated into the specification as if it were individually recited herein. For example, if the range 10-15 is disclosed, then 11, 12, 13, and 14 are also disclosed. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

It will be appreciated that the methods and compositions of the instant disclosure can be incorporated in the form of a variety of embodiments, only a few of which are disclosed herein. Variations of those embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Combinations of any exemplary embodiments disclosed above are also included as embodiments of the present disclosure. While the above-described exemplary embodiments discuss illustrative embodiments, these embodiments are not seen to be limiting.

What is claimed is:

1. A method of a manufacturing system including an injection molding machine and a conveyance apparatus, the method comprising:
   a first step of injecting a mold and cooling the mold at a molding operation position in the injection molding machine;
   a second step of ejecting a molded part from the mold at the molding operation position; and
   a third step of conveying the mold to a path of the conveyance apparatus and heating the mold on the path,
   wherein while the first step and the second step are performed for a first mold in the injection molding machine, the third step is performed for a second mold in the conveyance apparatus,
   wherein while the first step and the second step are performed for the second mold in the injection molding machine, the third step is performed for the first mold in the conveyance apparatus, and
   wherein the first mold and the second mold are exchanged alternatively.

2. The method according to claim 1,
   wherein a heating time to heat the mold in the third step is longer than a cooling time to cool the mold in the first step.

3. The method according to claim 1, wherein the heating of the mold in the third step includes heating the mold with any one of oil and high-temperature water.

4. The method according to claim 1, wherein the injection of the mold in the first step includes injecting the mold with ABS resin.

5. The method according to claim 1,
   wherein the first step includes injecting the mold with a molding material, and wherein the heating of the mold in the third step includes heating the mold to a temperature greater than a temperature at which a molding material melts.

\* \* \* \* \*